March 3, 1964 F. L. PETRY, JR 3,122,929

DIRECT AND VERNIER TUNING KNOB ARRANGEMENT

Filed May 18, 1962

INVENTOR.
FRANK L. PETRY JR.
BY
Marvin Moody
ATTORNEY 3,122,929

DIRECT AND VERNIER TUNING KNOB ARRANGEMENT

Frank L. Petry, Jr., Brooklyn, N.Y., assignor to Collins Radio Company, Cedar Rapids, Iowa, a corporation of Iowa Filed May 18, 1962, Ser. No. 195,801
5 Claims. (Cl. 74—10.5)

This invention relates in general to a coarse and fine tuning arrangement, as for example might be required in a radio receiver.

It is often desirable to adjust a shaft over coarse and fine ranges, as for example when tuning a radio receiver. If the receiver is far removed from the desired frequency it is desirable to rotate a tuning shaft rather rapidly; however, once the shaft has arrived in the vicinity of the desired frequency it is desirable to tune it rather slowly through a fine adjustment until the exact frequency is obtained.

It is an object of the present invention, therefore, to provide a mechanical arrangement wherein a tuning knob can be used for both coarse and fine tuning.

Another object of this invention is to provide a simple and inexpensive coarse and fine tuning arrangement.

A feature of the invention is found in the provision for a knob that may be used as a crank for coarse tuning in one position and may be used as a vernier for fine tuning in a second position.

Figure 1:
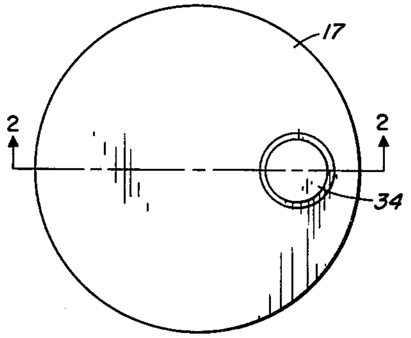
Figure 2:
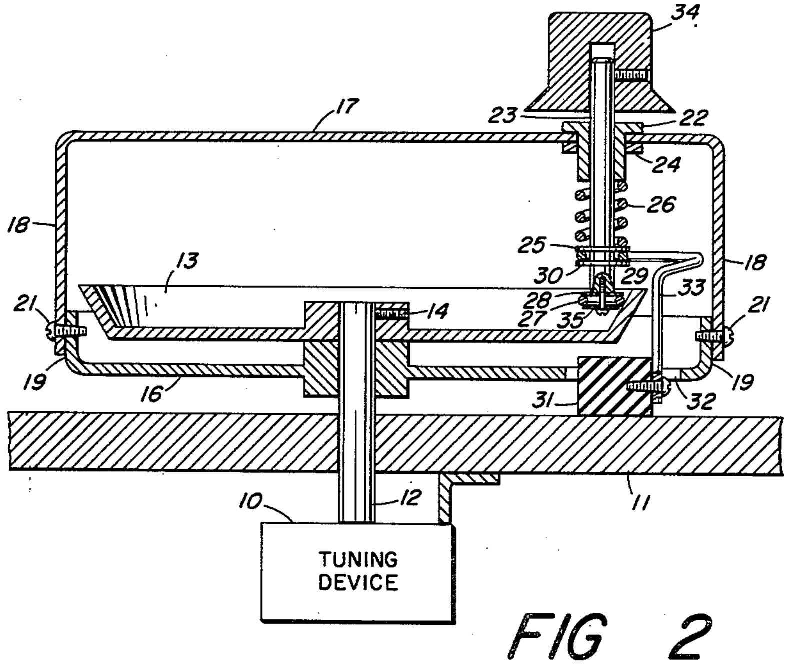

Further features, objects, and advantages of the invention will become apparent from the following description and claims when read in view of the accompanying drawings, in which FIGURE 1 is a front view of the tuning arrangement of this device, and FIGURE 2 is a sectional view taken on line 2—2 of FIGURE 1.

FIGURE 2 shows a tuning device 10 which might, for example, be mounted in a radio receiver. A tuning shaft 12 passes through a panel 11 and is connected to the tuning device 10. A pie plate shaped disc member 13 is nonrotatably attached to shaft 12 by means of a set screw 14. A disc 16 is rotatably supported on shaft 12 adjacent disc 13 and has a cover member 17 with downwardly-extending sides 18 which are attached to an upper lip 19 of disc 16, as for example by set screws 21. A bushing 22 is mounted in an offset opening formed in cover 17. A control shaft 23 is rotatably supported in bushing 22 so as to be parallel to the shaft 12. A washer 24 locks bushing 22 to member 17. Shaft 23 is slidably and rotatably connected to the bushing 22 and is biased by spring 26 which normally urges it toward the panel 11. Spring 26 is in compression between bushing 22 and a collar 25 attached to shaft 23. A rubber grommet 27 is mounted at the end of shaft 23 between washers 28 and 35 and engages the upwardly-extending lip 29 of disc 13.

A rubber locking foot 31 extends through an opening 32 formed in disc 16 and is rotatably attached to shaft 23 by an arm 33. Arm 33 passes around shaft 23 between collars 25 and 30.

In the position shown in FIGURE 2, wherein the grommet 27 engages the lip 29, the foot 31 engages the panel 11 to prevent the disc 16 and member 17 from rotating relative to the panel. Since arm 33 is rotatably connected to shaft 23, it may be rotated to drive the disc

13 through engagement of the grommet 27 and lip 29. During such operation the knob 34 will have to be turned a large number of turns to move the shaft 12 very much. This is due to the reduction in gearing with a relatively small diameter grommet driving the disc 13. Thus, knob 34 finely tunes shaft 12 in the position shown in FIGURE 2.

For rapid slewing or turning of shaft 12 the knob 34 is moved upwardly relative to FIGURE 2, which disengages the grommet 27 from the lip 29 and the foot 31 from the panel 11. The knob 34 may then be utilized as a crank and the members 17, 16, and disc 13 are rapidly turned. It is to be realized that the upper portion of rubber foot 31 engages the disc 13 in this position so as to turn the disc 13 with the disc 16 and member 17.

Thus, there is provided a coarse and fine tuning device which may be shifted from the coarse to the fine tuning arrangement by merely pulling out knob 34.

Although the apparatus has been described with respect to a preferred embodiment thereof, it is not to be so limited, as changes and modifications may be made which are within the full intended scope of the invention as defined by the appended claims.

I claim:

1. A fine and coarse clutching device comprising a reference plate, a controlled shaft rotatably supported by the reference plate, a first member rotatably supported by the controlled shaft, a control shaft attached to the first member, a second means nonrotatably attached to the controlled shaft, and a locking means attached to the control shaft and in engagement with the reference plate in a first position, and said control shaft movable longitudinally relative to the first member to move the locking means out of engagement with the reference plate and into engagement with the second means.

2. In apparatus according to claim 1 the second means being disc-shaped and with an upwardly-extending lip and friction means on the control shaft engageable with said lip when the control shaft is in the first position.

3. In apparatus according to claim 2, wherein a control knob is attached to the end of the control shaft.

4. In apparatus according to claim 2, a spring means between the first member and said control shaft to bias said control shaft to the first position.

5. A fine and coarse control for a controlled shaft comprising, a reference plate rotatably supporting the controlled shaft, a disc with a lip nonrotatably attached to the controlled shaft, a cylindrical member rotatably supported by the controlled shaft, a control shaft rotatably and slidably supported by the cylindrical member in a plane parallel to the controlled shaft but offset from the center thereof, a knob on one end of the control shaft, a driving means on the other end of the control shaft and in engagement with the lip in a first position, a spring attached to the control shaft and biasing it to the first position, a locking means attached to the control shaft and in engagement with the reference plate in the first position, and the control shaft movable to a second position such that the locking means disengages the reference plate and engages the disc and the driving means disengages the lip.

References Cited in the file of this patent

FOREIGN PATENTS

| | | |
|---|---|---|
| 593,677 | France | June 2, 1925 |
| 644,048 | France | Oct. 1, 1928 |